United States Patent
Booth et al.

[19]

[11] Patent Number: 6,136,192

[45] Date of Patent: Oct. 24, 2000

[54] FILTER BAG AND SEALING RING THEREFOR

[75] Inventors: Walter Booth, East Hanover, N.J.; Moshe Gershenson, Mohegan Lake, N.Y.; Leonard Falcone, Lake Hopatcong, N.J.

[73] Assignee: H-Tech, Inc., Wilmington, Del.

[21] Appl. No.: 09/249,052

[22] Filed: Feb. 12, 1999

Related U.S. Application Data

[63] Continuation-in-part of application No. 09/097,547, Jun. 15, 1998, abandoned.

[51] Int. Cl.[7] .............................. B01D 29/27; B01D 29/58
[52] U.S. Cl. .......................... 210/450; 210/452; 210/489; 277/918
[58] Field of Search ...................................... 210/444, 445, 210/448, 450, 451, 452, 453–455, 483, 488, 489; 55/502; 277/630, 641, 642, 648, 650, 589, 928, 918, 438, 464, 465, 387

[56] References Cited

U.S. PATENT DOCUMENTS

| | | |
|---|---|---|
| 531,701 | 1/1895 | Smith . |
| 1,710,758 | 4/1929 | Wright . |
| 1,972,264 | 9/1934 | Hirchhorn . |
| 3,592,768 | 7/1971 | Parker . |
| 3,640,392 | 2/1972 | Smith et al. . |
| 3,757,957 | 9/1973 | Smith . |
| 3,774,769 | 11/1973 | Smith . |
| 3,780,871 | 12/1973 | Hicks et al. . |
| 3,814,261 | 6/1974 | Morgan, Jr. . |
| 3,941,697 | 3/1976 | Johnson . |
| 3,959,137 | 5/1976 | Kirsgalvis . |
| 4,022,693 | 5/1977 | Morgan, Jr. . |
| 4,024,065 | 5/1977 | Morgan, Jr. . |
| 4,081,379 | 3/1978 | Smith . |
| 4,133,769 | 1/1979 | Morgan, Jr. . |
| 4,204,966 | 5/1980 | Morgan, Jr. . |
| 4,220,542 | 9/1980 | Morgan, Jr. . |
| 4,240,192 | 12/1980 | Davis . |
| 4,259,188 | 3/1981 | Morgan . |
| 4,282,098 | 8/1981 | Morgan, Jr. . |
| 4,283,281 | 8/1981 | Cogan . |
| 4,285,814 | 8/1981 | Morgan, Jr. . |
| 4,288,224 | 9/1981 | Romagnoli . |
| 4,300,927 | 11/1981 | Day . |
| 4,322,293 | 3/1982 | Morgan, Jr. . |
| 4,373,258 | 2/1983 | Hutchins . |
| 4,388,191 | 6/1983 | Morgan . |
| 4,419,240 | 12/1983 | Rosaen . |
| 4,455,731 | 6/1984 | Morgan . |
| 4,460,468 | 7/1984 | Morgan . |
| 4,490,253 | 12/1984 | Tafara . |
| 4,526,689 | 7/1985 | Morgan . |
| 4,552,661 | 11/1985 | Morgan . |
| 4,610,787 | 9/1986 | Morgan et al. . |

(List continued on next page.)

OTHER PUBLICATIONS

Loeffler Bag Filter Systems for Liquid Filtration.

*Primary Examiner*—W. L. Walker
*Assistant Examiner*—Als Schwartz
*Attorney, Agent, or Firm*—Selitto & Associates

[57] ABSTRACT

A sealing ring for use in connection with a filter bag assembly of a filter is disclosed. The sealing ring includes an annular body having an outer annular wall projecting from the body. The outer wall is flexible such that it can engage an adjacent surface of the filter in a liquid-tight manner for forming a seal between the surface and the sealing ring.

26 Claims, 10 Drawing Sheets

U.S. PATENT DOCUMENTS

| | | |
|---|---|---|
| 4,669,167 | 6/1987 | Asterlin . |
| 4,701,259 | 10/1987 | Rosaen . |
| 4,818,398 | 4/1989 | Lott et al. . |
| 4,948,504 | 8/1990 | Kierdorf et al. . |
| 4,983,292 | 1/1991 | Morgan, Jr. . |
| 5,039,410 | 8/1991 | Gershenson . |
| 5,045,194 | 9/1991 | Gershenson . |
| 5,075,004 | 12/1991 | Gershenson et al. . |
| 5,137,632 | 8/1992 | Morgan, Jr. . |
| 5,148,938 | 9/1992 | Morgan, Jr. . |
| 5,192,424 | 3/1993 | Beyne et al. . |
| 5,222,488 | 6/1993 | Forsgren . |
| 5,246,581 | 9/1993 | Goldman . |
| 5,251,776 | 10/1993 | Morgan, Jr. et al. . |
| 5,284,579 | 2/1994 | Covington . |
| 5,358,638 | 10/1994 | Gershenson . |
| 5,376,271 | 12/1994 | Morgan, Jr. . |
| 5,417,855 | 5/1995 | Gershenson . |
| 5,435,915 | 7/1995 | Connors, Jr. . |
| 5,441,650 | 8/1995 | Kirsgalvis . |
| 5,453,195 | 9/1995 | Jorgenson et al. . |
| 5,514,275 | 5/1996 | Morgan, Jr. . |
| 5,525,226 | 6/1996 | Brown et al. . |
| 5,527,463 | 6/1996 | Morgan, Jr. . |
| 5,643,451 | 7/1997 | Harris et al. . |
| 5,755,962 | 5/1998 | Gershenson et al. . |
| 5,770,066 | 6/1998 | Coates . |
| 5,840,188 | 11/1998 | Kirsgalvis . |

FILTER BAG AND SEALING RING THEREFOR

CROSS REFERENCE TO RELATED APPLICATION

This is a continuation-in-part of U.S. Ser. No. 09/097,547 filed Jun. 15, 1998, now abandoned.

FIELD OF THE INVENTION

The present invention relates to filter bags and sealing rings therefor and, more particularly, to a sealing ring adapted to provide a seal between an associated filter bag assembly and filter housing.

BACKGROUND OF THE INVENTION

In the past, various sealing rings have been developed for use in connection with filter bags (see, for instance, U.S. Pat. Nos. 3,640,392; 4,204,966; 4,259,188; 4,285,814; 4,419,240; 4,460,468; 4,490,253; 4,552,661; 4,669,167; 4,948,504; 5,075,004; 5,137,632; 5,246,581; 5,376,271; and 5,643,451). More particularly, these sealing rings are used to form a seal between associated housings and filter bags and to thereby prevent unfiltered liquid from bypassing the filter bags. It has, however, been found that these sealing rings perform the sealing function poorly or unsatisfactorily. Accordingly, there is a need for a sealing ring adapted to efficiently form an effective fluid-tight seal between an associated housing and filter bag.

SUMMARY OF THE INVENTION

The present invention overcomes the disadvantages and shortcomings of the prior art discussed above by providing a new and improved sealing ring adapted for use in connection with filter bags. More particularly, the sealing ring includes an annular body having an annular outer wall. More particularly, the outer wall projects from the body and is adapted to form a seal against an adjacent surface of an associated filter.

In accordance with one feature of the present invention, the sealing ring includes an urging mechanism for urging the outer wall radially outwardly. In response, the outer wall engages the adjacent surface of the filter assembly in a liquid-tight manner.

Another feature of the present invention involves providing the sealing ring with an inner annular wall which is concentrical with respect to the outer wall and which includes at least one pressure channel. The outer wall is adapted to flex radially outwardly in response to internal fluid pressure in the filter, which pressure is applied to the outer wall through the pressure channel.

In accordance with yet another feature of the present invention, the sealing ring is provided with an inner annular wall which is concentrical relative to the outer wall. The inner wall is adapted to engage a cover of the filter in a liquid-tight manner so as to form a seal between the cover and the inner wall.

BRIEF DESCRIPTION OF THE DRAWINGS

For a more complete understanding of the present invention, reference is made to the following detailed description of exemplary embodiments considered in conjunction with the accompanying drawings, in which.

DETAILED DESCRIPTION OF THE EXEMPLARY EMBODIMENTS

Figure 1:
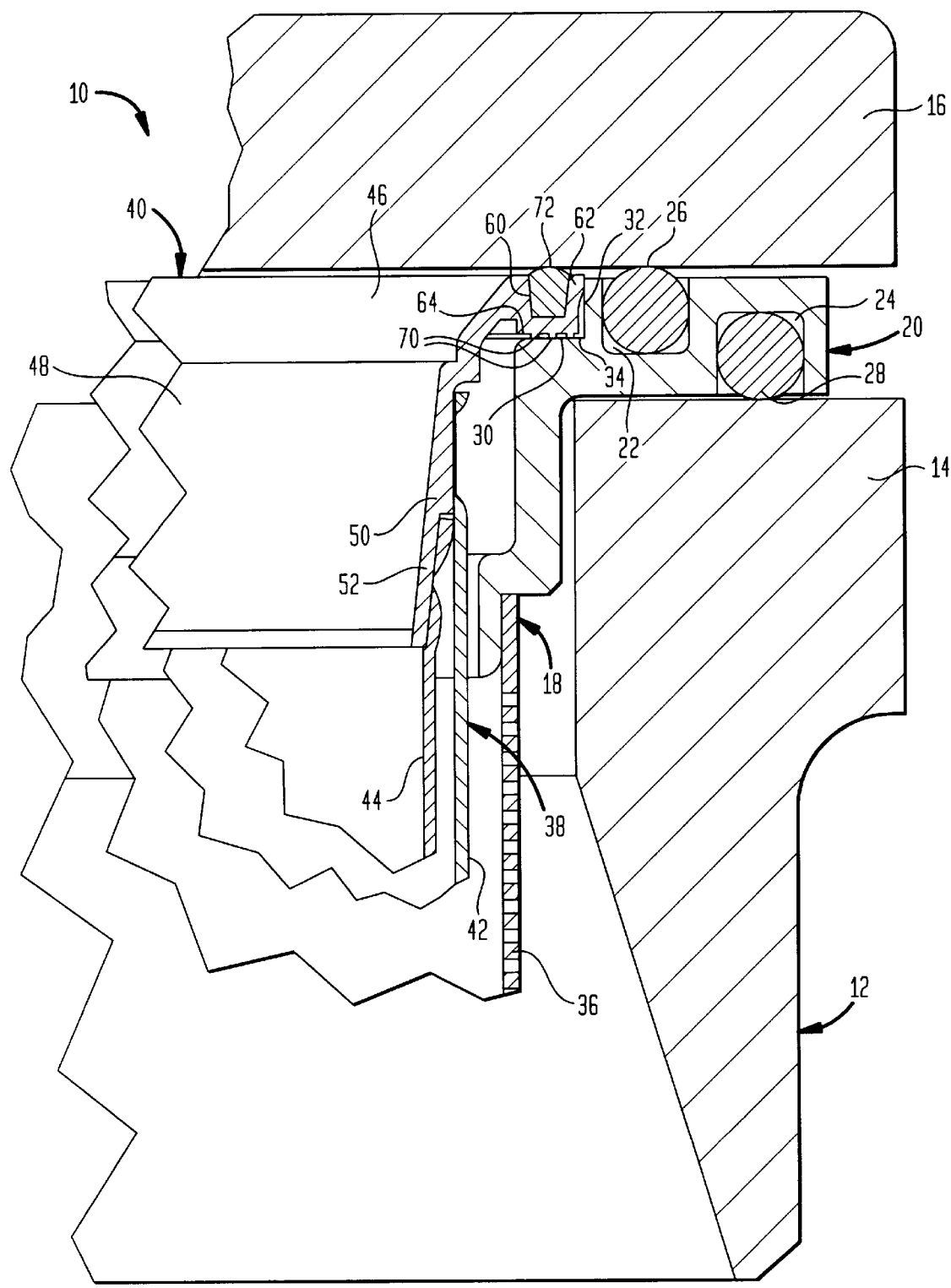
FIG. 1 is a cross-sectional view of a portion of a filter which is equipped with a filter bag assembly having a sealing ring constructed in accordance with a first embodiment of the present invention.

FIG. 1 shows a portion of a filter 10 constructed in accordance with a first embodiment of the present invention. The filter has a housing 12 provided with an open upper end 14. A cover 16 is applied to the upper end 14 of the housing 12 and is affixed to same in a conventional manner. A basket 18 is mounted in the housing 12 from the upper end 14. More particularly, the basket 18 includes an annular basket flange 20 supported on the upper end 14 of the housing 12 and thereby interposed between the cover 16 and the housing 12. The basket flange 20 includes a pair of grooves 22, 24 for receiving O-rings 26, 28, respectively, so as to provide a liquid-tight seal between the cover 16 and the housing 12. The basket flange 20 also includes a shoulder 30 and a vertical wall (i.e., surface) 32 which projects from the shoulder 30. The shoulder 30 and the vertical wall 32 define an annular L-shaped space 34. The basket 18 also includes a basket member 36 depending from the basket flange 20.

Figure 4:
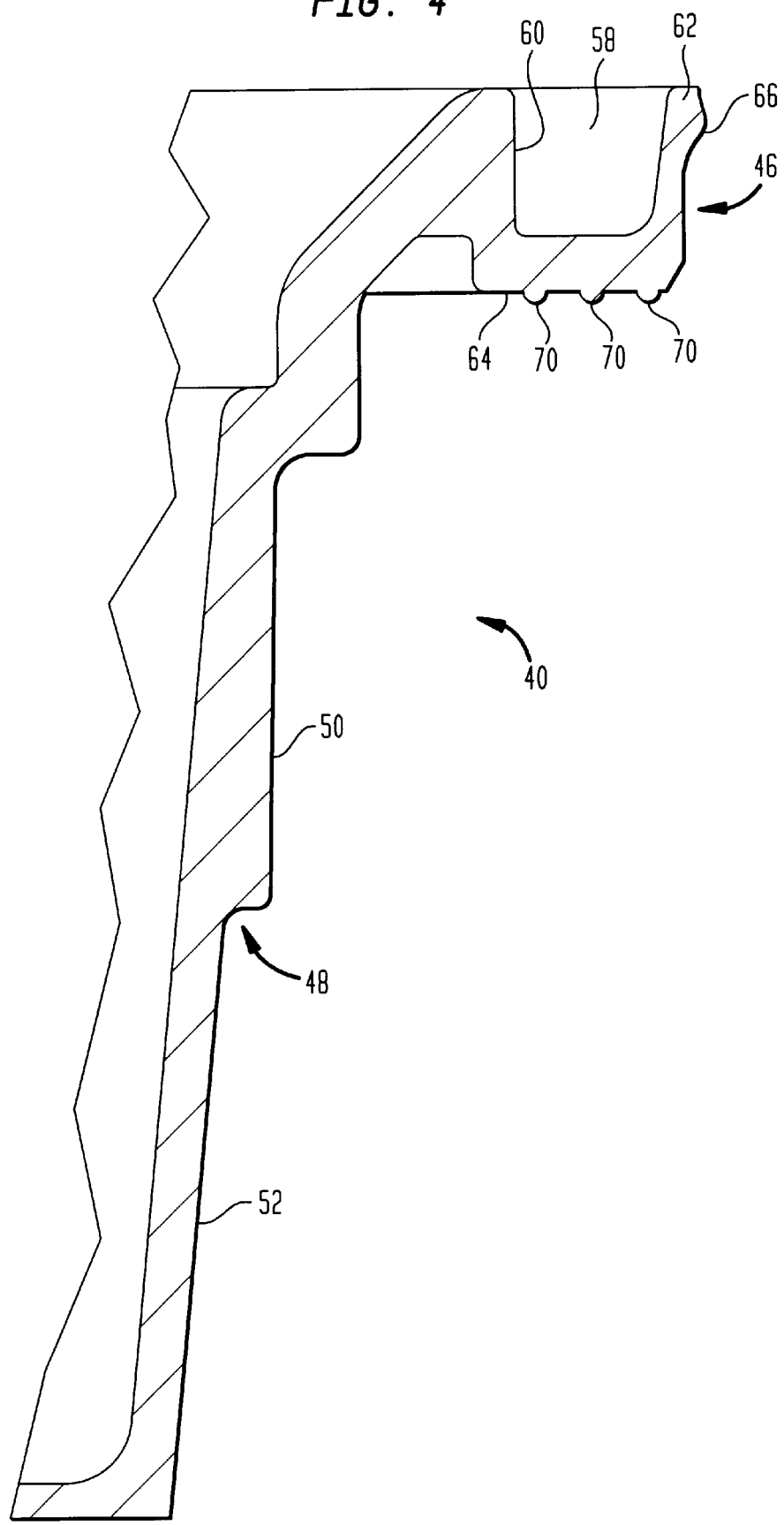
FIG. 4 is an enlarged view of the portion circled in FIG. 3.

Still referring to FIG. 1, the filter 10 is also provided with a filter bag assembly 38 mounted in the housing 12 and including a sealing ring 40 and a pair of filter bags 42, 44 which are concentrically mounted to the sealing ring 40. With reference to FIGS. 1 and 4, the sealing ring 40 includes an annular body having a flange section 46 and a skirt section 48. More particularly, the skirt section 48, which depends from the flange section 46, is provided with an upper portion 50 and a lower portion 52. The upper portion 50 is welded or sewn to the filter bag 42, while the lower portion 52 is stitched, sewn or welded to the filter bag 44. The lower portion 52 of the skirt section 48 is stepped inwardly with respect to the upper portion 50. That is, the outer diameter of the lower portion 52 is smaller than that of the upper portion 50 to compensate for the thickness of the filter bag 44 and to thereby accommodate same. Moreover, the thickness of the lower portion 52 is relatively thin compared to that of the upper portion 50 so as to facilitate the stitching of the filter bag 44 to the lower portion 52.

Figure 2:
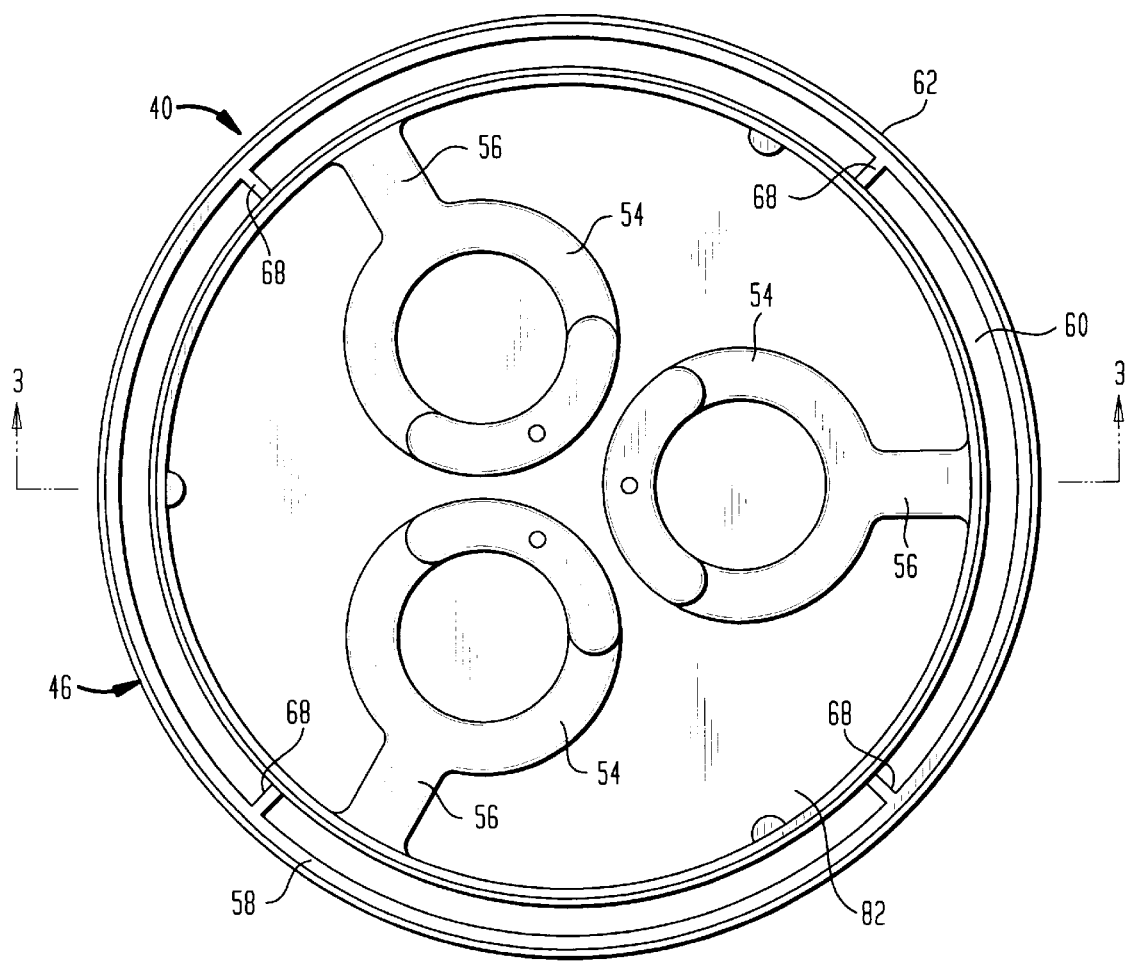
FIG. 2 is a top plan view of the sealing ring shown in FIG. 1.
Figure 3:
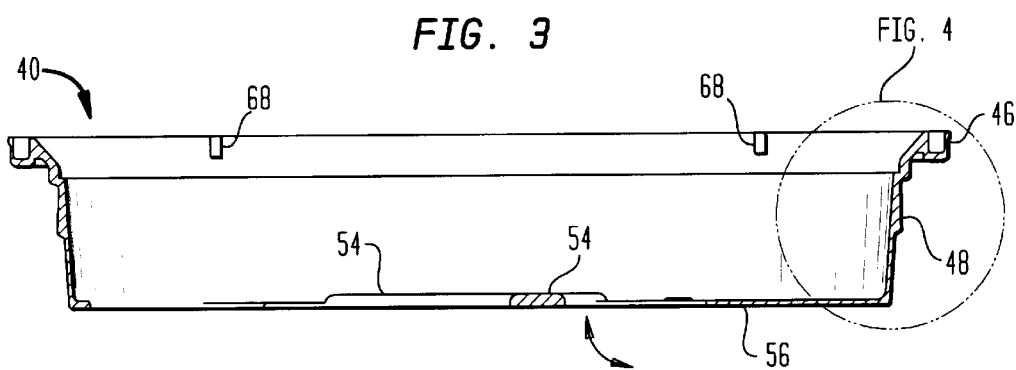
FIG. 3 is a cross-sectional view, taken along section line 3—3 and looking in the direction of the arrows, of the sealing ring shown in FIG. 2.

With reference to FIGS. 2 and 3, the skirt section 48 also includes a plurality of pull rings 54 for use in removing the sealing ring 40 and therefore the filter bag assembly 38 from the housing 12. In this regard, arms 56 extend radially inwardly from the lower portion 52 of the skirt section 48. More particularly, each of the pull rings 54 is connected to a corresponding one of the arms 56. The arms 56 are arranged along the lower portion 52 in an equally spaced manner such that the pull rings 54 are spaced apart from each other by 120°. Moreover, the arms 56 are sized in such a manner that the pull rings 54 are positioned in close proximity to one another. Each of the pull rings 54 is also sized and shaped so as to receive a user's finger. As a result, the pull rings 54 are adapted to be firmly gripped by a user's hand and then pulled upwardly to release the sealing ring 40 from the housing 12 without urging the pull rings 54 towards one another. The pull rings 54 are also resiliently flexible such that they are pivotable in the downward and upward directions relative to the lower portion 52 of the skirt section 48 (as indicated by the arrow in FIG. 3).

Referring back to FIGS. 1, 2 and 4, the flange section 46 of the sealing ring 40 is sized and shaped so as to be received in the L-shaped space 34 of the basket flange 20 for mounting the filter bag assembly 38 from the basket 18. The flange section 46 includes an annular groove 58 defined by an annular inner wall 60, an annular outer wall 62 and a bottom wall 64. More particularly, the outer wall 62 projects upwardly from the bottom wall 64 and is flexible such that it can bend inwardly (i.e., towards the inner wall 60) and outwardly (i.e., away from the inner wall 60). The outer wall 62 has a hump 66 formed on an outer side thereof for purposes to be discussed hereinafter. The inner wall 60, which is connected to the skirt section 48 of the sealing ring 40, also projects upwardly from the bottom wall 64 and is rigid compared to the outer wall 62. Drainage channels 68 (see FIG. 2) are formed in the inner wall 60 for draining liquid collecting in the groove 58 during the operation of the filter 10. The bottom wall 64, which is sized and shaped so as to be supported on the shoulder 30 of the basket flange 20, is provided with concentrical sealing ridges 70 depending therefrom for purposes to be discussed hereinafter.

Figure 5:
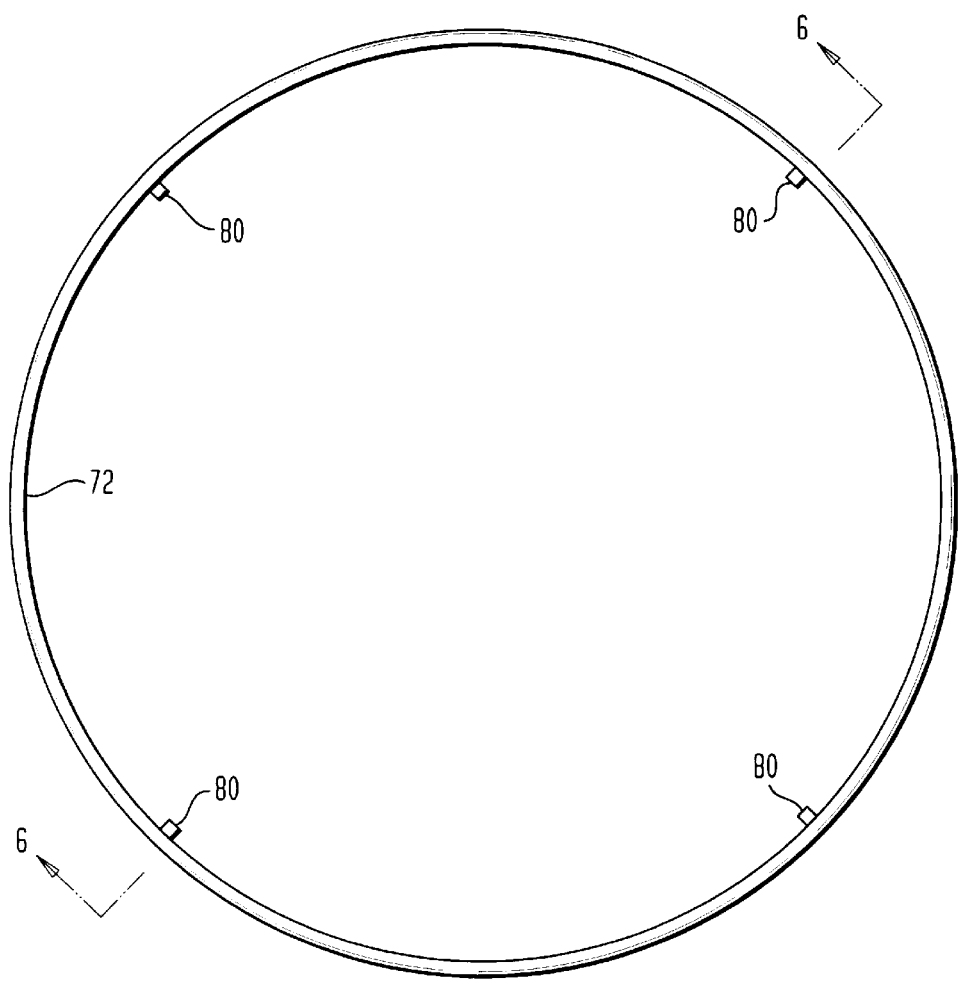
FIG. 5 is a top plan view of a wedge ring of the sealing ring shown in FIG. 1.
Figure 6:
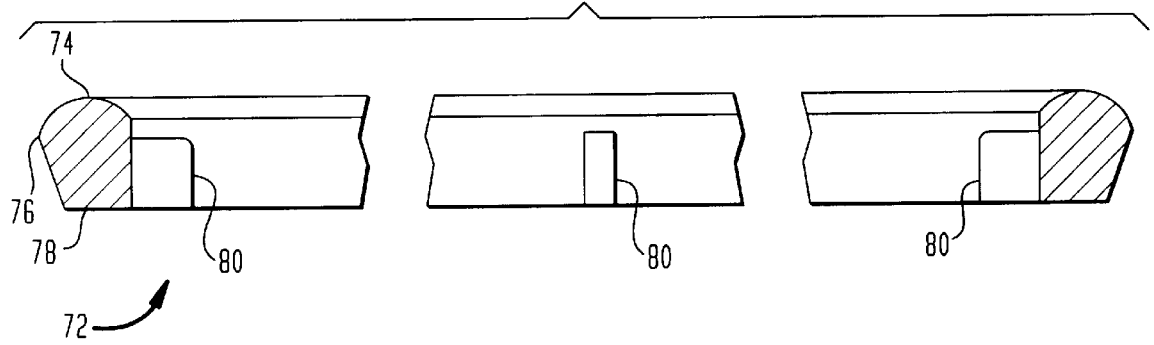
FIG. 6 is an enlarged cross-sectional view, taken along section line 6—6 and looking in the direction of the arrows, of the wedge ring shown in FIG. 5.

With reference to FIGS. 1, 5 and 6, the sealing ring 40 is also provided with a wedge ring 72 which has a wedge-shaped cross-sectional area. More particularly, the wedge ring 72 includes a round upper end 74, a widened middle portion 76 and a tapered lower end 78. The middle portion 76 has a width greater than that of the lower end 78 of the wedge ring 72. The wedge ring 72 is sized and shaped so as to be pressed (i.e., inserted) into the groove 58 of the sealing ring 40 and to urge the outer wall 62 of the flange section 46 radially outwardly. The wedge ring 72 also has a height (i.e., the distance measured between the upper end 74 and the lower end 78) which is greater than the depth of the groove 58 such that when the wedge ring 72 is fully pressed or inserted into the groove 58, the upper end 74 of the wedge ring 72 is positioned (i.e., projects) above the sealing ring 40 (see FIG. 1). The wedge ring 72 also includes a plurality of tabs 80 extending radially inwardly therefrom. Each of the tabs 80 is sized and shaped so as to be received in a corresponding one of the drainage channels 68 for retaining the wedge ring 72 in proper position relative to the sealing ring 40.

In order to mount the filter bag assembly 38 in the housing 12, the sealing ring 40 is placed in the L-shaped space 34 of the basket flange 20. With the tabs 80 of the wedge ring 72 aligned with the drainage channels 68 of the sealing ring 40, the tapered lower end 78 of the wedge ring 72 is placed above the groove 58 of the sealing ring 40. Next, the cover 16 is applied to the housing 12, causing the wedge ring 72 to move downwardly. More particularly, the cover 16 engages the wedge ring 72 and applies a downward axial force upon same. In response, the wedge ring 72 is pressed into the groove 58 of the sealing ring 40 and thereby urges the outer wall 62 of the sealing ring 40 radially outwardly against the vertical wall 32 of the basket flange 20. In other words, the wedge ring 72 applies a radial force upon the outer wall 62 in an outward direction. As a result, the hump 66 of the sealing ring 40 engages the vertical wall 32 of the basket flange 20 in a liquid-tight manner and thereby forms a liquid-tight seal between the sealing ring 40 and the basket flange 20. In response to the axial force applied by the cover 16, the wedge ring 72 also urges the sealing ring 40 downwardly against the shoulder 30 of the basket flange 20. As a result, the sealing ridges 70 of the sealing ring 40 engage the shoulder 30 of the basket flange 20 in a liquid-tight manner and thereby form a liquid-tight seal between the bottom wall 64 of the sealing ring 40 and the shoulder 30 of the basket flange 20. The cover 16 and the wedge ring 72 also cooperate with each other to form a liquid-tight seal therebetween.

It should be appreciated that the present invention provides numerous advantages over the prior art. For instance, because the sealing ring 40 provides a plurality of liquid-tight seals at multiple locations (i.e., between the outer wall 62 of the sealing ring 40 and the vertical wall 32 of the basket flange 20, between the bottom wall 64 of the sealing ring 40 and the shoulder 30 of the basket flange 20 and between the cover 16 and the wedge ring 72) and because each of these seals is positively formed and maintained as a result of various forces applied to the sealing ring 40, the present invention performs a sealing function more effectively as compared to the prior art discussed above. As a result, the sealing ring 40 eliminates the need to provide additional sealing mechanisms to supplement or enhance its sealing function.

It should also be appreciated that the pull rings 54 provide additional advantages over the prior art. For instance, because the pull rings 54 are pivotable (as indicated by the arrow in FIG. 3), they allow a bag positioner or container (see, for instance, U.S. Pat. Nos. 3,959,137 and 4,220,542) to be positioned in the filter bag 44. More particularly, the pull rings 54 are adapted to pivot downwardly in response to the insertion of a bag positioner through an opening 82 (see FIG. 2) formed in the sealing ring 40. In other words, the pull rings 54 are pivotable so as not to obstruct the opening 82. Moreover, because the pull rings 54 are spaced from one another by 120°, when pulled upwardly, they prevent the sealing ring 40 from assuming an oval or elliptical shape which would hinder the removal of same from the basket flange 20 and therefore from the housing 12. Accordingly, the pull rings 54 facilitate the removal of the sealing ring 40 and hence the filter bag assembly 38 from the filter 10.

It should be noted that the present invention can have numerous modifications and variations. For instance, the groove 58 of the sealing ring 40 can have different shapes and/or sizes. Further, the wedge ring 72 can be replaced with other mechanisms adapted to apply a radial force upon the outer wall 62 of the sealing ring 40 and to thereby urge same against the basket flange 20. For example, a spring-like member can be permanently or removably inserted in the groove 58. Other mechanisms can also be used for applying a downward axial force upon the wedge ring 72. Moreover, the pull rings 54 can be omitted or replaced with conventional handles. In addition, because of the seals provided by the sealing ring 40, the O-ring 26 can be removed without compromising the liquid-tight integrity of the filter 10.

It should also be noted that the present invention can be used in many different types of filter housings. For instance, the present invention can be used in connection with a filter housing which includes an integrally formed shoulder projecting from an interior wall of the filter housing for supporting an associated basket and/or filter bag assembly. In this type of housing, the bottom wall 64 of the sealing ring 40 is supported directly on the shoulder rather than on the basket flange of an associated basket, thereby forming a fluid-tight seal between the sealing ring 40 and the shoulder. Likewise, the outer wall 62 of the sealing ring 40 directly engages an adjacent surface of the interior wall of the housing, rather than an associated basket flange, to form a liquid-tight seal between the sealing ring 40 and the housing.

FIGS. 7–14B and FIGS. 15 and 16 depict second and third embodiments of the present invention. Elements illustrated in FIGS. 7–14B and FIGS. 15 and 16, which correspond, either identically or substantially, to the elements described above with respect to the embodiment of FIGS. 1–6, have been designated by corresponding reference numerals increased by one hundred and two hundred, respectively. Unless otherwise stated, the embodiments of FIGS. 7–16 are constructed and assembled in the same basic manner as the embodiment of FIGS. 1–6.

Figure 7:
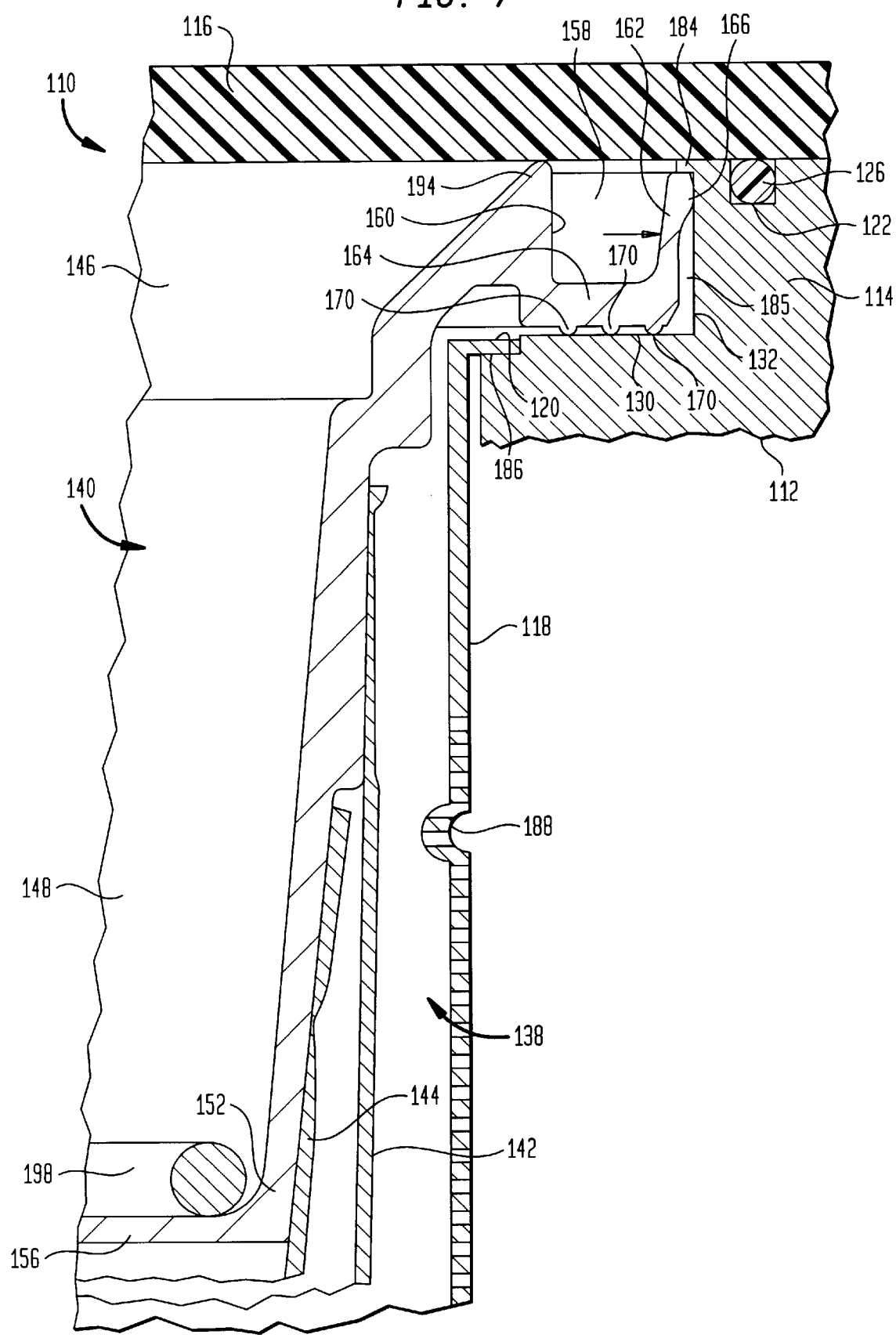
FIG. 7 is a cross-sectional view of a portion of a filter which is equipped with a filter bag assembly having a sealing ring constructed in accordance with a second embodiment of the present invention.

FIG. 7 shows a section of a filter 110 having a cover 116 and a housing 112. While the housing 112 has a conventional construction, to facilitate consideration and discussion, its construction will be briefly described below. The housing 112 is provided with an open upper end 114 and a shoulder 130 formed in the upper end 114. A vertical wall 132 extends vertically upwardly from the shoulder 130, while a retaining projection 184 extends radially inwardly from the upper end 114 of the housing 112 (i.e., from the top end of the vertical wall 132) and forms a channel 185 between the shoulder 130 and the retaining projection 184. The housing 112 also has a support 186 located adjacent to the shoulder 130. An O-ring 126 is positioned in a groove 122 formed in the upper end 114 of the housing 112 for engaging the cover 116 in a fluid-tight manner.

Figure 11:
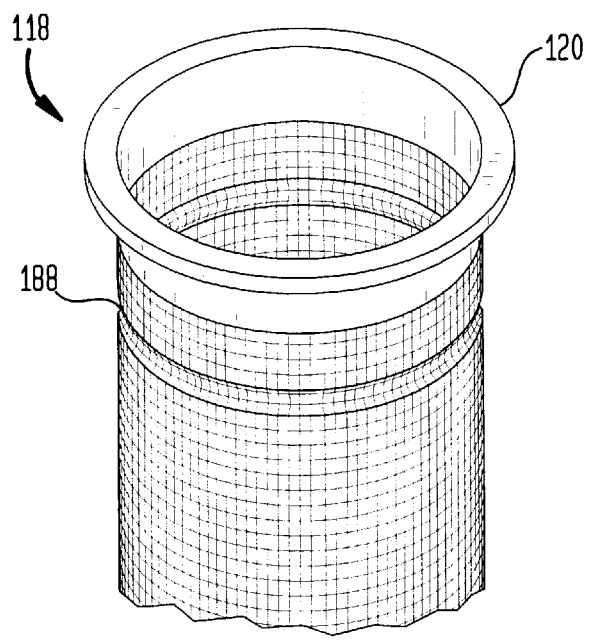
FIG. 11 is a basket which is utilized in the filter shown in FIG. 7.

With reference to FIGS. 7 and 11, the filter 110 is also provided with a basket 118 mounted in the housing 112. More particularly, the basket 118 includes a flange 120 supported on the support 186 of the housing 112 for suspending the basket 118 in the housing 112 from the support 186. The basket 118 is provided with an annular projection 188 located proximate the flange 120 and projecting radially inwardly from the basket 118 for purposes to be discussed hereinafter.

Figure 8:
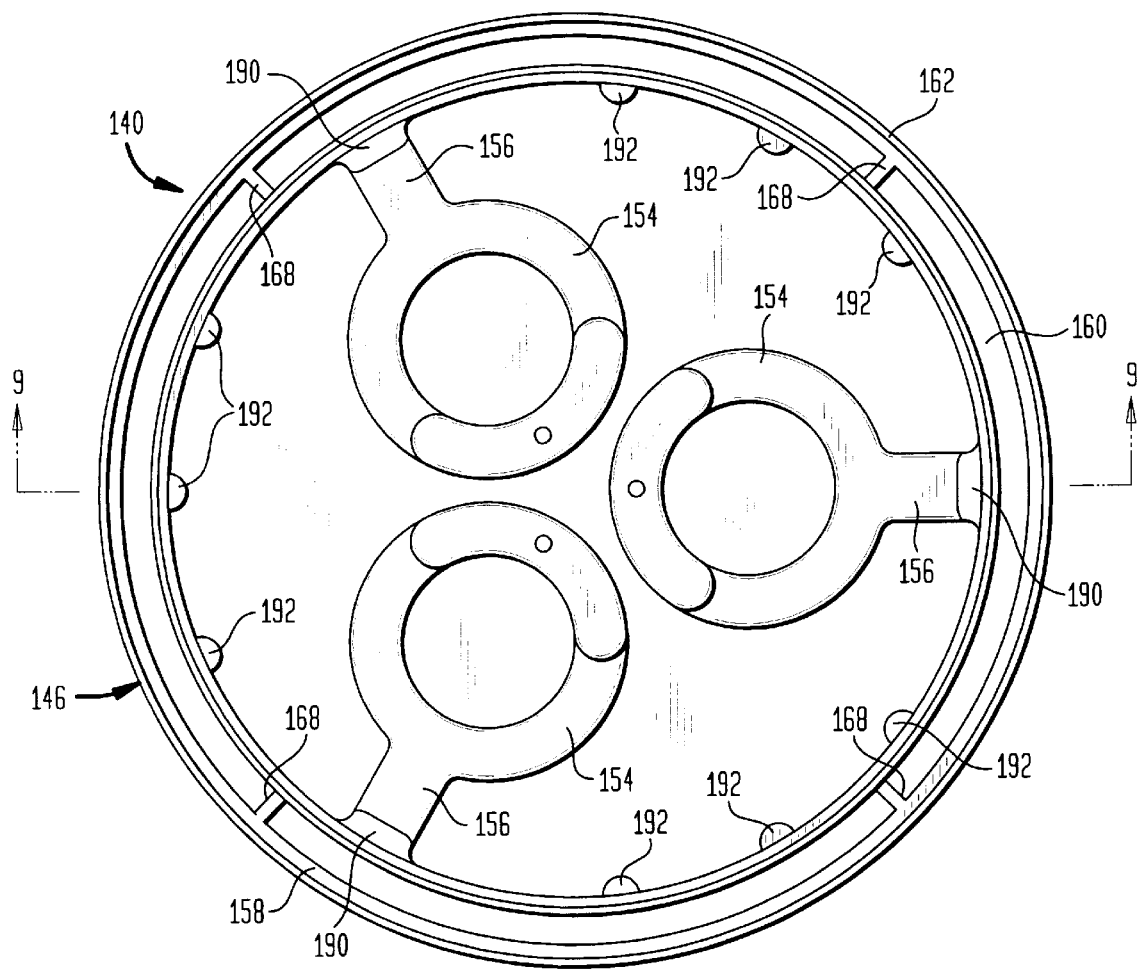
FIG. 8 is a top plan view of the sealing ring shown in FIG. 7.
Figure 9:
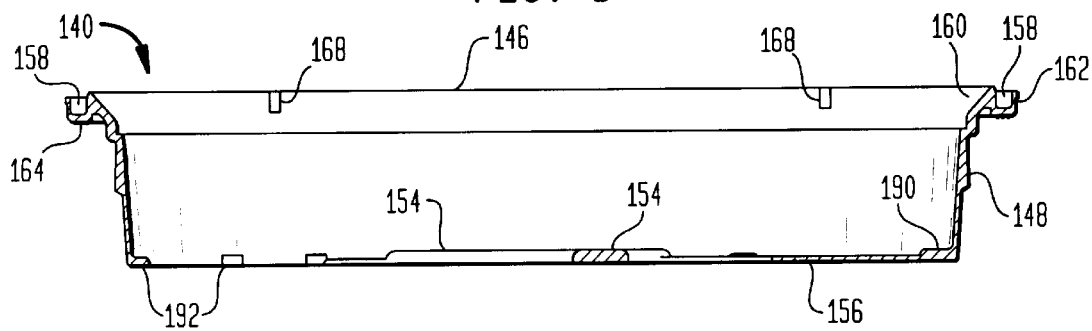
FIG. 9 is a cross-sectional view, taken along section line 9—9 and looking in the direction of the arrows, of the sealing ring shown in FIG. 8.

Referring to FIGS. 7–9, the filter 110 further includes a filter bag assembly 138 mounted in the housing 112 and including a sealing ring 140. The sealing ring 140 is substantially identical to the sealing ring 40 of the embodiment of FIGS. 1–6 in construction and operation except as described hereinafter. The sealing ring 140 includes an annular body having a flange section 146, a skirt section 148 and filter bags 142, 144 which are attached to the skirt section 148. Pull rings 154 are also mounted to the skirt section 148 for use in removing the sealing ring 140 and therefore the filter bag assembly 138 from the housing 112. More particularly, arms 156 extend radially inwardly from a lower portion 152 of the skirt section 148 and are connected to the pull rings 154. Each of the arms 156 has an end 190 connected to the skirt section 148 and having a thickness greater than that of the rest of the arm 156. Tabs 192 extends radially inwardly from the lower portion 152 of the skirt section 148. The tabs 192 are arranged in annular fashion in a substantially equally spaced manner.

Still referring to FIGS. 7–9, the flange section 146, which is sized and shaped so as to be supported on the shoulder 130 of the housing 112, includes an inner annular wall 160, an outer annular wall 162 and a bottom wall 164. More particularly, the inner, outer and bottom walls 160, 162, 164 cooperate to form a groove 158 therebetween. The outer wall 162, which is provided with a hump 166, is sized and shaped so as to be snap-fitted into the channel 185 of the housing 112 when the sealing ring 140 is properly positioned in the housing 112. The inner wall 160 has a peak 194 which is located at an elevation higher than the elevation of the top end of the outer wall 162. Pressure channels 168 (see FIGS. 8 and 9), which communicate with the groove 158, are formed in the inner wall 160. The bottom wall 164 is sized and shaped so as to be supported on the shoulder 130 of the housing 112 and is provided with concentrical sealing ridges 170 depending therefrom.

Unlike the sealing ring 40 of the embodiment of FIGS. 1–6, the sealing ring 140 is not provided with a wedge ring. The outer wall 162 of the sealing ring 140 is urged into sealing engagement with the housing 112 by the internal fluid pressure within the housing 112 applied through the pressure channels 168 as will be described further hereinafter.

Figure 10:
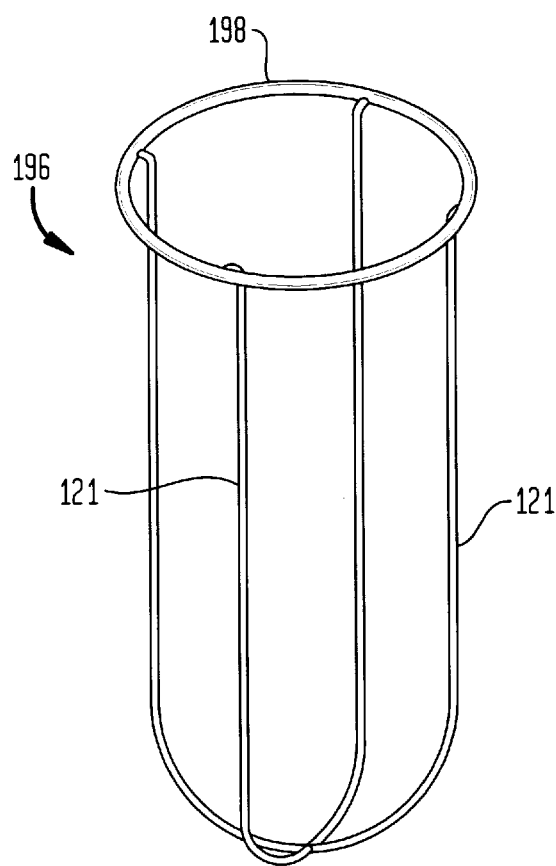
FIG. 10 is a frame which is utilized in the filter shown in FIG. 7.

Referring to FIGS. 7 and 10, the filter 110 is also provided with a frame 196 suspended in the housing 112 from the sealing ring 140. More particularly, the frame 196 has a collar 198 sized and shaped so as to be supported on the tabs 192 and the ends 190 of the arms 156. The frame 196 also has loops 121 depending from the collar 198 and positioned in the interior of the filter bag 144 for preventing the filter bags 142, 144 from collapsing inwardly.

Figure 12:
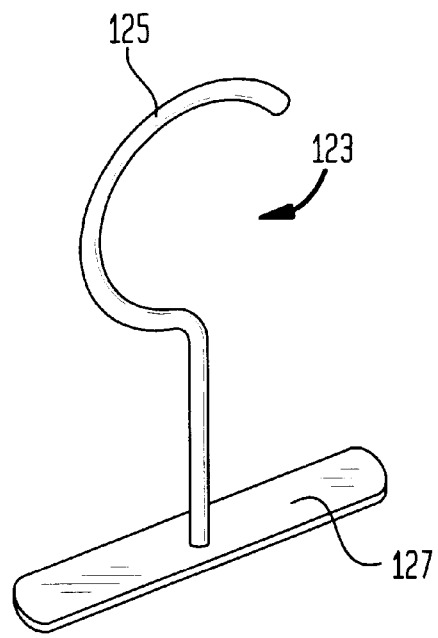
FIG. 12 is a tool for use in removing the basket shown in FIG. 11.

Referring to FIG. 12, a basket removing tool 123 has a handle 125 at one end thereof and a bar or plate 127 at an opposite end. The bar 127 has a length that is greater than the inner diameter of the annular projection 188 of the basket 118.

Figure 13:
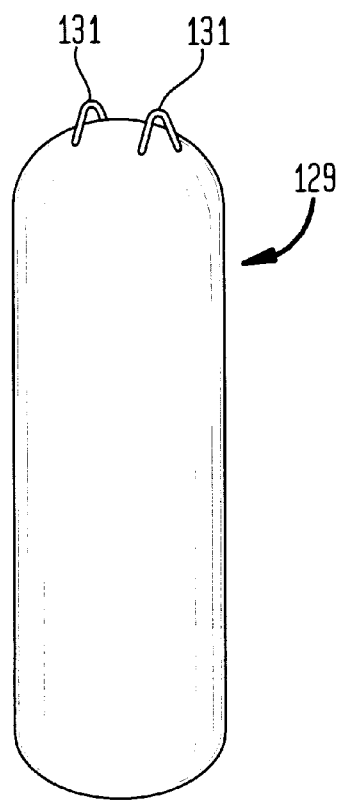
FIG. 13 is an evacuation balloon utilized in the filter shown in FIG. 7.
Figure 14A:
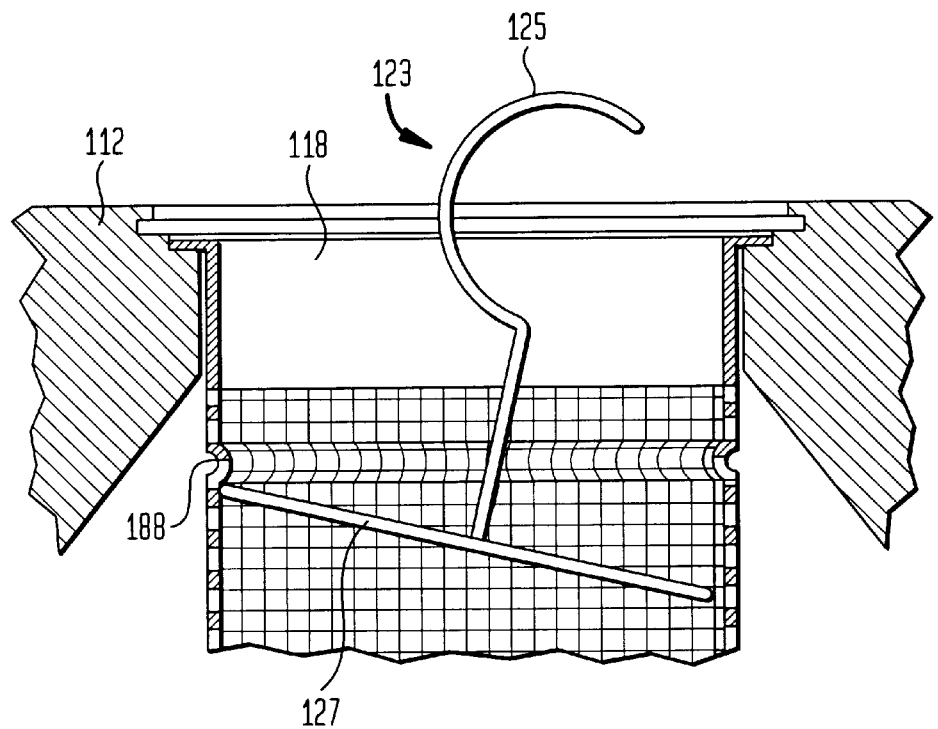
FIGS. 14A and 14B are schematic views illustrating removal of the basket shown in FIG. 11 from the filter.
Figure 14B:
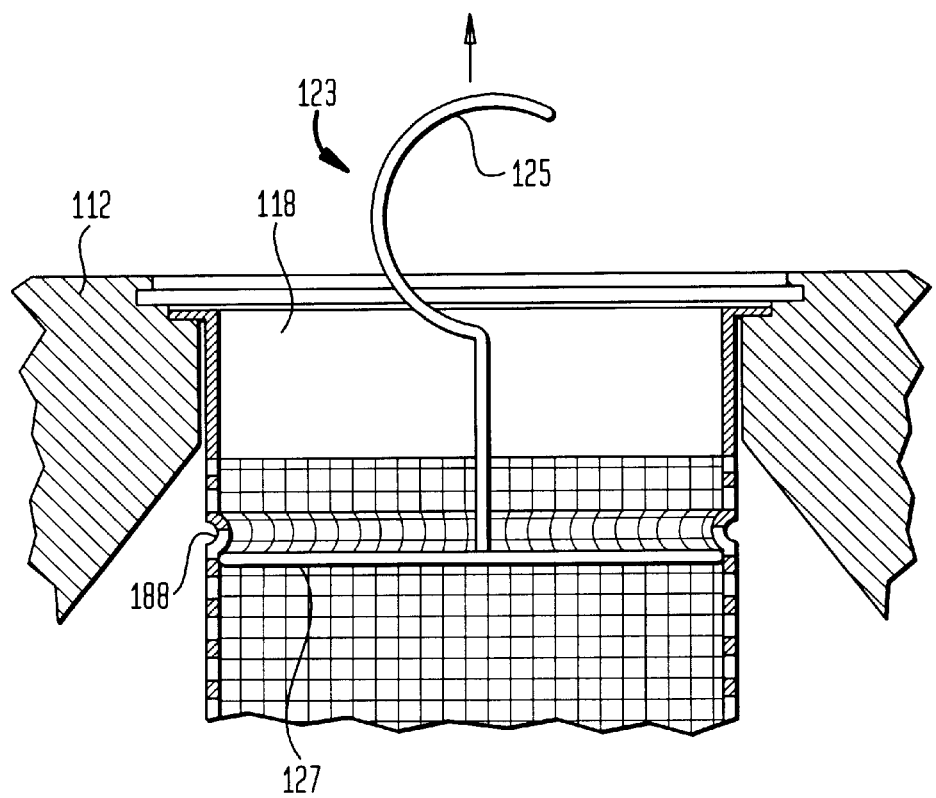

With reference to FIG. 13, an evacuation balloon 129 has a pair of handles 131. The balloon 129 is mounted within the frame 196 for reducing the volume of liquid within the filter bags 142, 144 during the operation of the filter 110.

In order to mount the filter bag assembly 138 in the housing 112, after positioning the basket 118 in the housing 112, the sealing ring 140 is placed on the shoulder 130 of the housing 112. The sealing ring 140 is then pushed downwardly such that the outer wall 162 is snap-fitted into the channel 185 of the housing 112. Once snap-fitted, the outer wall 162 is retained in the channel 185 by the retaining projection 184 of the housing 112. The frame 196 is then mounted in the housing 112, supported from the sealing ring 140. When the cover 116 is applied to the housing 112, it engages the peak 194 of the inner wall 160 of the sealing ring 140, urging the sealing ring 140 downwardly and thereby biasing the sealing ridges 170 of the sealing ring 140 into sealing engagement with the shoulder 130 of the housing 112. In this regard, the weight of the frame 196 and the weight of the balloon 129 provide additional downward force for enhancing sealing engagement between the shoulder 130 and the sealing ridges 170.

In operation, because the groove 158 of the sealing ring 140 is in communication with the interior of the housing 112 through the pressure channels 168 of the sealing ring 140, pressurized fluid (e.g., liquid) flows into the groove 158 of the sealing ring 140 through the pressure channels 168. The fluid thus applies radially outward force (as indicated by the arrow in FIG. 7) against the outer wall 162 so as to cause the outer wall 162 to bow radially outwardly. As a result, the hump 166 of the outer wall 162 is urged against the vertical wall 132 of the housing 112 and thus forms a liquid-tight seal between the vertical wall 132 and the outer wall 162. In other words, the outer wall 162 seals against the vertical wall 132 in response to pressure applied thereto by fluid in the housing 112.

In order to remove the filter bag assembly 138 from the housing 112, the balloon 129 and the frame 196 are removed from the housing 112. Next, one of the pull rings 154 of the sealing ring 140 is gripped by a user's finger and is pulled upwardly, thereby releasing the outer wall 162 from the channel 185. In this regard, it should be noted that pulling more than one pull rings 154 flexes the body of the sealing ring 140 in such a way that the outer wall 162 becomes firmly lodged in the channel 185, making it extremely difficult to remove the sealing ring 140 from the housing 112. Accordingly, only one of the pull rings 154 should be used in removing the sealing ring 140 from the housing 112. The sealing ring 140 is provided with more than one pull ring so that even if the pull ring in use accidentally breaks off from the sealing ring 140 during the process of removing the filter bag assembly 138 from the housing 112, the filter bag assembly 138 can still be removed from the housing 112 by using one of the remaining pull rings.

After removing the filter bag assembly 138 from the housing 112, the filter basket 118 is removed from the housing 112. To do so, with the handle 125 of the tool 123 gripped by a user's hand, the bar 127 is oriented in tilted fashion with respect to the horizontal axis and is then inserted into the basket 118 (see FIG. 14A). When the bar 127 is positioned below the annular projection 188 of the basket 118, it is rotated to assume a horizontal orientation. The handle 125 is then pulled upwardly (as indicated by the arrow in FIG. 14B), causing the bar 127 to engage the annular projection 188 of the basket 118 and thereby causing the basket 118 to be lifted from the housing 112 for removal from same (see FIG. 14B).

It should be noted that the embodiment shown in FIGS. 7–14B can have many modifications and variations. For instance, the frame 196 can be suspended in the housing 112 by a continuous annular support structure extending radially inwardly from the sealing ring 140 rather than by the tabs 192 and the ends 190 of the arms 156. Moreover, the sealing ring 140 can be used in many different types of filter housing.

Figure 15:
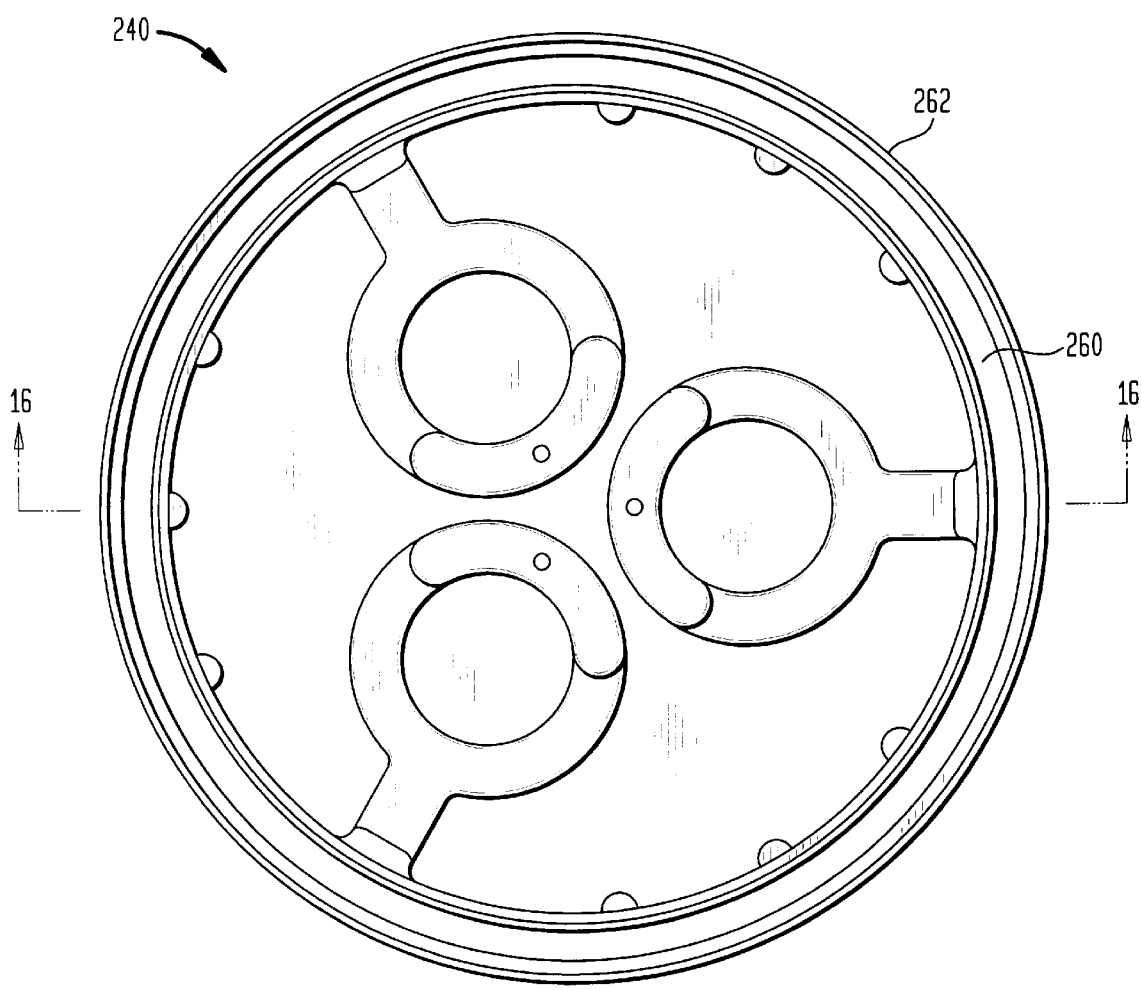
FIG. 15 is a top plan view of a sealing ring constructed in accordance with a third embodiment of the present invention.
Figure 16:
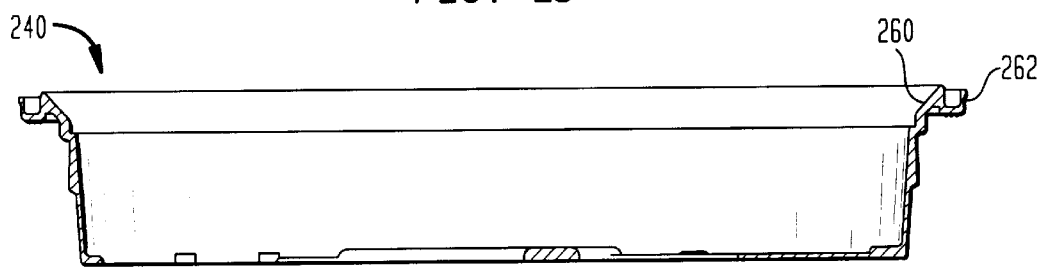
FIG. 16 is a cross-sectional view, taken along section line 16—16 and looking in the direction of the arrows, of the sealing ring shown in FIG. 15.

FIGS. 15 and 16 show a sealing ring 240 constructed in accordance with a third embodiment of the present invention. More particularly, the sealing ring 240 is identical to the sealing ring 140 of the embodiment of FIGS. 7–14B, except that the sealing ring 240 has an inner annular wall 260 which is devoid of pressure or drainage channels. Due to the absence of pressure channels, the inner wall 260 is adapted to engage a cover of an associated filter in a fluid-tight manner, forming a seal between the inner wall 260 and the cover. While the sealing ring 240 is provided with an outer annular wall 262, because of the seal between the inner wall 260 and the cover, internal fluid pressure within the filter is not applied to the outer wall 262. As a result, the outer wall 262 seals against an adjacent wall of the filter by way of interference fit.

It will be understood that the embodiments described herein are merely exemplary and that a person skilled in the art may make many variations and modifications without departing from the spirit and scope of the invention. All such variations and modifications are intended to be included within the scope of the invention as defined in the appended claims.

We claim:

1. A filter bag assembly adapted for use in filtering apparatus, comprising at least one filter bag; and a sealing ring having an annular body which includes a skirt attached to said at least one filter bag, said annular body having an annular support wall, which is sized and shaped so as to be supported on a supporting structure of the filtering apparatus, an outer annular wall, which projects substantially upwardly from said support wall, an inner annular wall, which projects substantially upwardly from said support wall, which is located radially inwardly from said outer wall and which is connected to said skirt, and an annular groove, which is formed between said inner and outer walls and which is delimited by said support wall, said outer wall being sized and shaped so as to engage an adjacent sealing surface of the filtering apparatus in a substantially fluid-tight manner, said support wall being sized and shaped so as to engage the supporting structure in a substantially fluid-tight manner, said outer wall being flexible such that it can flex radially outwardly in response to application of radially outward force to said outer wall from said groove, whereby said outer wall is engageable with the adjacent sealing surface in a fluid-tight manner, said outer wall being sized and shaped so as to flex radially outwardly in response to radially outward force applied to said outer wall by internal fluid pressure in the filtering apparatus, said inner wall being sized and shaped so as to be engaged by a cover of the filtering apparatus for urging said support wall in an axial direction against the supporting structure in response to application of the cover to the filtering apparatus, whereby a fluid-tight seal is formed between said support wall and the supporting structure, and said inner wall including at least one channel for permitting fluid communication between said groove and an interior of the filtering apparatus such that the internal fluid pressure in the filtering apparatus can be applied from the interior of the filtering apparatus to said outer wall through said at least one channel and said groove.

2. The filter bag assembly of claim 1, wherein said sealing ring includes supporting means for supporting a filter accessory from said body.

3. The filter bag assembly of claim 2, wherein said supporting means includes a plurality of tabs extending radially inwardly from said annular body, said tabs being arranged so as to support the filter accessory therefrom.

4. The filter bag assembly of claim 3 wherein said filter accessory includes a collar sized and shaped so as to be supported on said tabs.

5. The filter bag assembly of claim 4, comprising removing means for facilitating the removal of said sealing ring from the filtering apparatus.

6. The filter bag assembly of claim 5, wherein said removing means includes a plurality of arms, each of which extends radially inwardly from said annular body, and a plurality of pull rings, each of which is attached to an end of a corresponding one of said arms remote from said annular body.

7. The filter bag assembly of claim 6, wherein said arms cooperate with said tabs so as to support said collar of said filter accessory thereon.

8. The filter bag assembly of claim 7, wherein said arms are arranged in an annular fashion and substantially equally spaced from one another.

9. The filter bag assembly of claim 1, wherein said at least one channel includes a plurality of fluid channels, each of which extends through said inner wall in a radial direction and communicates with said groove and the interior of the filtering apparatus, said plurality of fluid channels being arranged in an annular fashion.

10. The filter bag assembly of claim 9, wherein said support wall includes sealing means for providing a fluid-tight seal between said support wall and the supporting structure.

11. The filter bag assembly of claim 10, wherein said sealing means includes a plurality of concentric sealing ridges depending from said support wall.

12. The filter bag assembly of claim 11, wherein said outer wall is sized and shaped so as to be received in an annular retaining channel of the filtering apparatus such that said body can be properly retained in the filtering apparatus.

13. The filter bag assembly of claim 12 wherein said outer wall includes a projection projecting radially outwardly from said outerwall, said projection being sized and shaped so as to engage the adjacent sealing surface of the filtering apparatus in a fluid-tight manner when said outer wall flexes radially outwardly.

14. The filter bag assembly of claim 13, wherein said at least one filter bag includes a first filter bag and a second filter bag which are concentrically attached to said skirt.

15. The filter bag assembly of claim 14, wherein said skirt includes a first annular portion for attachment to said first bag and a second annular portion for attachment to said second bag, said second portion being positioned below said first portion and located radially inwardly relative to said first portion.

16. The filter bag assembly of claim 1, wherein said groove has a U-shape.

17. The filter bag assembly of claim 16, wherein said inner wail defines an inner side of said groove; wherein said outer wall defines an outer side of said groove; and said support wall defines a bottom side of said groove.

18. The filter bag assembly of claim 17, wherein said groove has an open top side located opposite said bottom side.

19. Apparatus for filtering fluids, comprising a housing; a cover sized and shaped so as to be mounted to said housing; a filter bag assembly; and supporting means for supporting said filter bag assembly in said housing, said filter bag assembly having at least one filter bag and a sealing ring having an annular body which includes a skirt attached to said at least one filter bag, said annular body including an annular support wall, which is sized and shaped so as to be supported on said supporting means, an outer annular wall, which projects substantially upwardly from said support wall, an inner annular wall, which projects substantially upwardly from said support wall, which is located radially inwardly form said outer wall and which is connected to said skirt and an annular groove, which is formed between said inner and outer walls and which is delimited by said support wall, said outer wall being sized and shaped so as to engage an adjacent sealing surface of said supporting means in a substantially fluid-tight manner, and said support wall being sized and shaped so as to engage said supporting means in a substantially fluid-tight manner, said outer wall being flexible such that it can flex radially outwardly in response to application of radially outward force to said outer wall from said groove, whereby said outer wall is engageable with said adjacent sealing surface in a fluid-tight manner, said outer wall being sized and shaped so as to flex radially outwardly in response to radially outward force applied to said outer wall by internal fluid pressure in said housing, said inner wall being sized and shaped so as to be engaged by said cover for urging said support wall in an axial direction against said supporting means in response to application of said cover to said housing, whereby a fluid-tight seal is formed between said support wall and said supporting means, and said inner wall including at least one channel for permitting fluid communication between said groove and an interior of said housing such that the internal fluid pressure in said housing can be applied from said interior of said housing to said outer wall through said at least one channel aid said groove.

20. The apparatus of claim 19, wherein said at least one channel includes a plurality of fluid channels, each of which extends through said inner wall in a radial direction and communicates with said groove and said interior of said housing, said plurality of fluid channels being arranged in an annular fashion.

21. The apparatus of claim 20, wherein said support wall includes sealing means for providing a fluid-tight seal between said support wall and said supporting means.

22. The apparatus of claim 21, wherein said sealing means includes a plurality of concentric sealing ridges depending from said support wall.

23. The apparatus of claim 22, wherein said outer wall is sized and shaped so as to be received in an annular retaining channel of said supporting means such that said body can be properly retained on said supporting means.

24. The apparatus of claim 23, wherein said outer wall includes a projection projecting radially outwardly from said outer wall, said projection being sized and shaped so as to engage said adjacent sealing surface of said supporting means in a fluid-tight manner when said outer wall flexes radially outwardly.

25. The apparatus of claim 24, wherein said at least one filter bag includes a first filter bag and a second filter bag which are concentrically attached to said skirt.

26. The apparatus of claim 25, wherein said skirt includes a first annular portion for attachment to said first bag and a second annular portion for attachment to said second bag, said second portion being positioned below said first portion and located radially inwardly relative to said first portion.

* * * * *